(12) United States Patent
Ohishi et al.

(10) Patent No.: US 11,235,304 B2
(45) Date of Patent: Feb. 1, 2022

(54) FLOW REACTOR AND MANUFACTURING FACILITY COMPRISING THE FLOW REACTOR

(71) Applicant: KANEKA CORPORATION, Osaka (JP)

(72) Inventors: Takahiro Ohishi, Takasago (JP); Shiori Ozasa, Takasago (JP); Shun Watanabe, Takasago (JP); Hiroaki Yasukouchi, Takasago (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 16/979,731

(22) PCT Filed: Jan. 11, 2019

(86) PCT No.: PCT/JP2019/000664
§ 371 (c)(1),
(2) Date: Sep. 10, 2020

(87) PCT Pub. No.: WO2019/187497
PCT Pub. Date: Oct. 3, 2019

(65) Prior Publication Data
US 2021/0039064 A1 Feb. 11, 2021

(30) Foreign Application Priority Data
Mar. 27, 2018 (JP) ............... JP2018-060121

(51) Int. Cl.
*B01J 19/24* (2006.01)
*B01J 19/00* (2006.01)

(52) U.S. Cl.
CPC ......... *B01J 19/243* (2013.01); *B01J 19/0013* (2013.01); *B01J 2219/00063* (2013.01); *B01J 2219/00099* (2013.01)

(58) Field of Classification Search
CPC .... B01J 19/243; B01J 19/242; B01J 19/0013; B01J 2219/0063; B01J 2219/00099; B01J 8/067; B01J 2208/00061
See application file for complete search history.

(56) References Cited

U.S. PATENT DOCUMENTS 3,248,179 A * 4/1966 Norwood .............. C08F 2/38
422/132
3,450,505 A 6/1969 Nomura et al.
(Continued)

FOREIGN PATENT DOCUMENTS

GB 1029172 * 5/1966
JP 49-42591 B1 11/1974
(Continued)

OTHER PUBLICATIONS

International Search Report issued in PCT/JP2019/000664 (PCT/ISA/210), dated Feb. 19, 2019.
(Continued)

*Primary Examiner* — Lessanework Seifu
(74) *Attorney, Agent, or Firm* — Birch, Stewart, Kolasch & Birch, LLP

(57) ABSTRACT

An object is to provide a novel flow reactor capable of measuring the internal temperature. The flow reactor including a tubular reaction line, wherein the flow reactor further includes an internal temperature measurement unit provided at one or more location of the tubular reaction line, the internal temperature measurement unit includes a thermometer with a temperature sensor, and the temperature sensor is inserted into the tubular reaction line.

16 Claims, 4 Drawing Sheets

(56) References Cited

U.S. PATENT DOCUMENTS

| | | | |
|---|---|---|---|
| 5,762,879 A | 6/1998 | Nomura et al. | |
| 2007/0166212 A1 | 7/2007 | Pawlak et al. | |
| 2008/0071109 A1 | 3/2008 | Yada et al. | |
| 2010/0112094 A1* | 5/2010 | Yoshida | B01J 19/0013 424/703 |
| 2011/0224463 A1 | 9/2011 | Zikel et al. | |
| 2013/0217841 A1 | 8/2013 | Chiefari et al. | |
| 2015/0320088 A1 | 11/2015 | Ni et al. | |
| 2016/0280540 A1 | 9/2016 | Finnerty et al. | |
| 2017/0165632 A1 | 6/2017 | Homewood et al. | |
| 2018/0102117 A1 | 4/2018 | Notsu | |
| 2019/0126230 A1 | 5/2019 | Ozasa et al. | |

FOREIGN PATENT DOCUMENTS

| | | |
|---|---|---|
| JP | 8-131817 A | 5/1996 |
| JP | 2002-143670 A | 5/2002 |
| JP | 2009-524508 A | 7/2009 |
| JP | 2013-543021 A | 11/2013 |
| JP | 2016-41426 A | 3/2016 |
| JP | 2018-60121 A | 4/2018 |
| WO | WO 2007/060412 A | 5/2007 |
| WO | WO 2017/222048 A1 | 12/2017 |

OTHER PUBLICATIONS

Extended European Search Report for European Application No. 19775080.5, dated Nov. 24, 2021.

* cited by examiner

[FIG. 1]
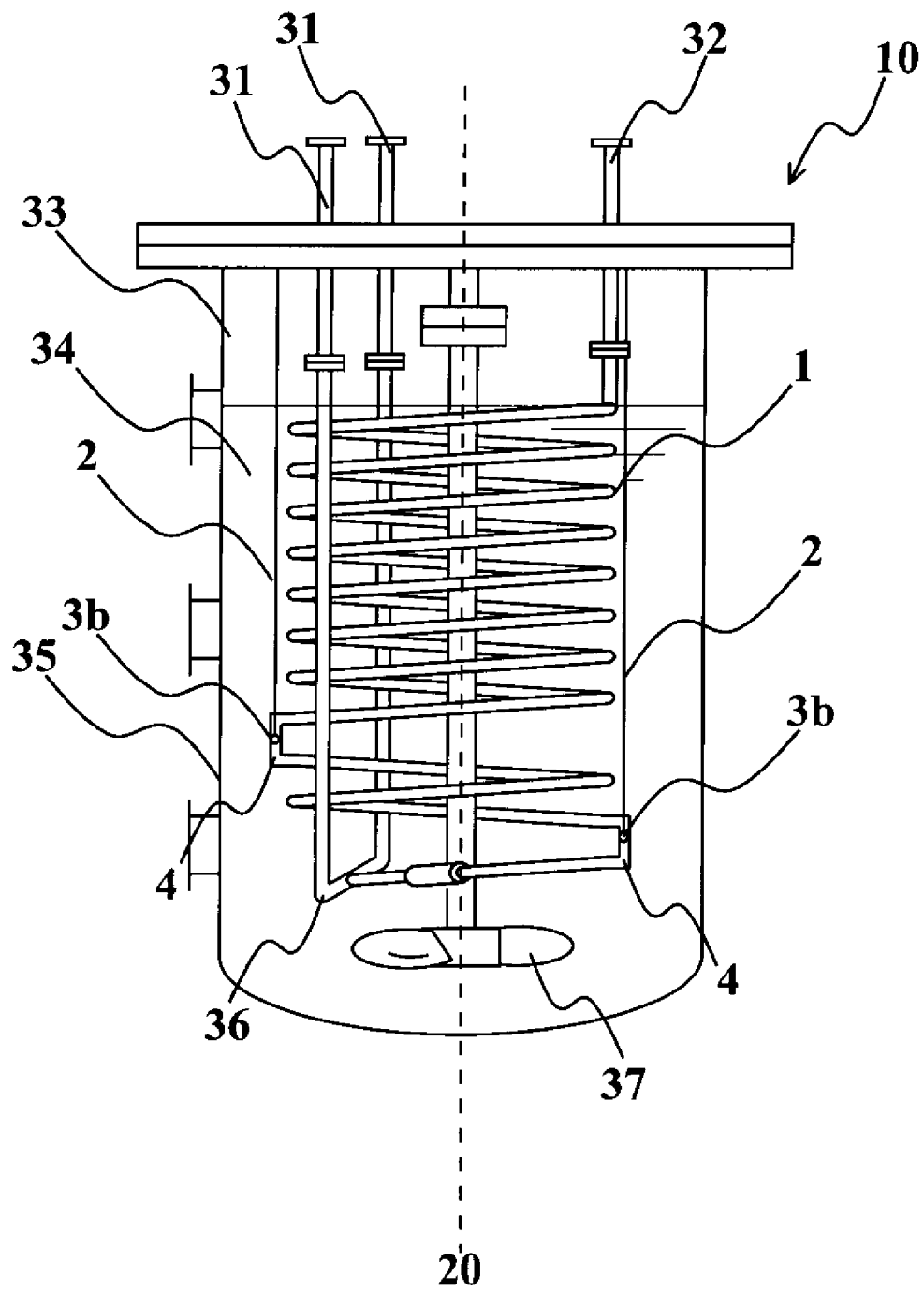

[FIG. 2-1]
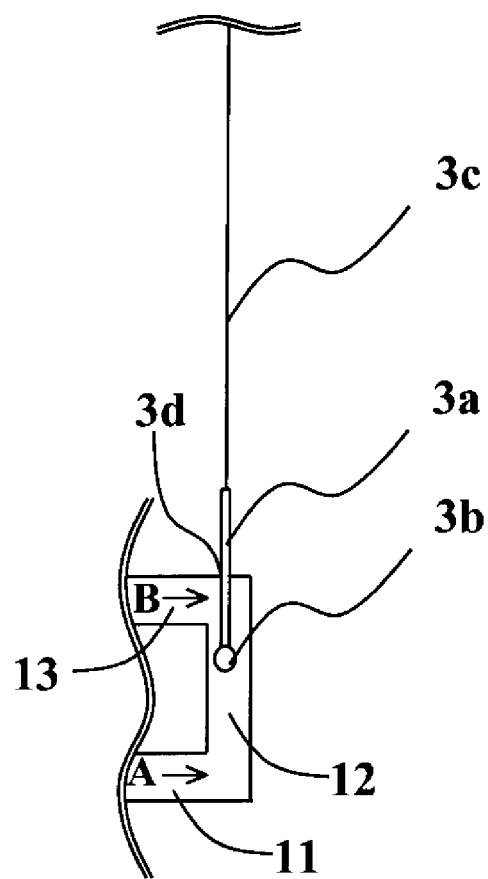

[FIG. 2-2]
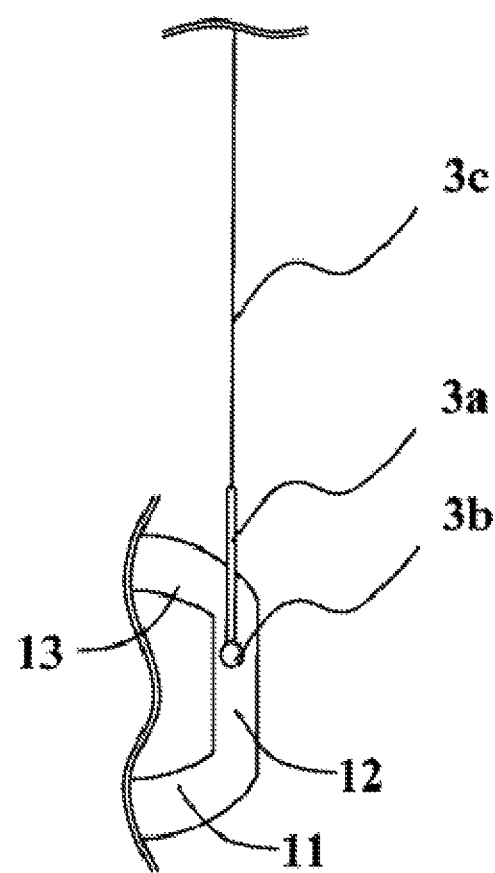

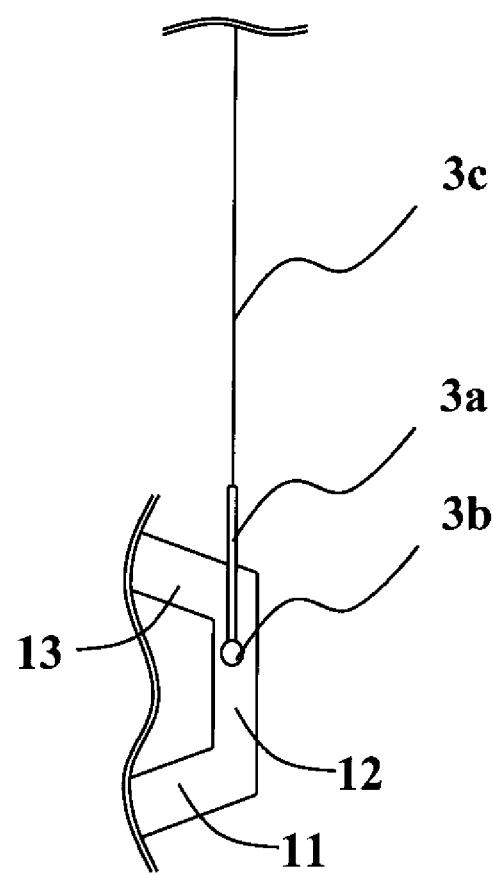
[FIG. 2-3]

FLOW REACTOR AND MANUFACTURING FACILITY COMPRISING THE FLOW REACTOR

TECHNICAL FIELD

The present invention relates to a flow reactor and a manufacturing facility comprising the flow reactor. More particularly, the present invention relates to a flow reactor comprising a tubular reaction line, wherein the flow reactor further comprises an internal temperature measurement unit provided at one or more locations of the tubular reaction line, the internal temperature measurement unit comprises a thermometer with a temperature sensor, and the temperature sensor is inserted into the tubular reaction line.

BACKGROUND ART

A micro-flow reactor is a chemical reaction apparatus generally comprising a microchannel in the order of sub-millimeter as a reaction field. The micro-flow reactor has attracted attention in recent years because it has specific effects, due to the micro reaction field, such as high-speed mixing performance (for example, when two liquids are mixed in a micro reaction space, the substance diffusion distance in the two liquids decreases, resulting in shortening the time of mass transfer movement), heat removal efficiency (for example, since the reaction field of the micro-flow reactor is very small, thermal efficiency is extremely high and temperature control is easy), reaction control performance, interface control performance, or the like. In addition, it is expected that the technology of the micro-flow reactor provides various effects such as improved safety and significantly reduced cost of equipment along with downsizing of the whole process, process intensification (micro in macro) by incorporating into existing processes, and production of substances that could not be produced by an existing production method.

However, the micro-flow reactor has a problem that only a limited amount can be processed at a time. Therefore, process development of a flow reactor is being carried out for the purpose of providing practical process by increasing processing amount. The flow reactor is a chemical reaction apparatus in which the diameter of a flow channel is enlarged to the order of millimeters to centimeters to the extent that the characteristics of the micro-flow reactor are not impaired to enhance the operability. The flow reactor is mainly composed of a raw material feeding line, a reaction unit, and an operation control unit (such as, for example, Patent Document 1).

RELATED ART DOCUMENTS

Patent Document

Patent Document 1: JP 2013-543021 (A)

SUMMARY OF THE INVENTION

Problems to be Solved by the Invention

Conventionally, the temperature of a flow reactor has been controlled only by measuring the temperature of the outer wall of the flow reactor or the temperature of temperature adjustment equipment of the flow reactor without usually measuring an internal temperature in the flow reactor. However, as a result of the studies of the inventors, it was found that, although a flow reactor has a large heat transfer area relative to its capacity and thus has advantages of high heat removal efficiency and high heating efficiency, the flow reactor has difficulty of local control of heat there if the reaction locally proceeds due to its high heat removal efficiency and high heating efficiency. In particular, when a tubular reactor is used, and the flow channel is long, it is difficult to accurately determine the internal temperature, and it is impossible to detect a locally proceeding reaction. In the recent precision synthesis, the demand for strict control of the internal temperature of a flow reactor is increasing.

Under such circumstances, an object of the present invention is to provide a flow reactor including a tubular reaction line in which a temperature in the tubular reaction line can be more accurately measured.

Solutions to the Problems

As a result of intensive studies for achieving the above object, the inventors have found that a flow reactor including a tubular reaction line, wherein the flow reactor further includes an internal temperature measurement unit provided at one or more locations of the tubular reaction line, the internal temperature measurement unit includes a thermometer with a temperature sensor, and the temperature sensor is inserted into the tubular reaction line can achieve the above object. The invention has been made based on such a finding.

That is, the flow reactor according to the present invention has one or more features described below.

[1] A flow reactor comprising a tubular reaction line, wherein the flow reactor further comprises an internal temperature measurement unit provided at one or more locations of the tubular reaction line, the internal temperature measurement unit comprises a thermometer with a temperature sensor, and the temperature sensor is inserted into the tubular reaction line.

[2] The flow reactor according to [1], wherein the tubular reaction line is curved and comprises a straight flow channel in part of the tubular reaction line, and the internal temperature measurement unit is positioned in the straight flow channel.

[3] The flow reactor according to [2], wherein the tubular reaction line is helical, and the straight flow channel is substantially parallel to a helical axis of the helical tubular reaction line.

[4] The flow reactor according to [3], wherein part of the tubular reaction line comprises successive three flow channels of an inflow-side flow channel, an intermediate flow channel, and an outflow-side flow channel, the straight flow channel is the intermediate flow channel, and the intermediate flow channel is substantially parallel to the helical axis of the helical tubular reaction line.

[5] The flow reactor according to [4], wherein each of the inflow-side flow channel and the outflow-side flow channel is formed straight.

[6] The flow reactor according to any one of [1] to [5], wherein the internal temperature measurement unit is provided at least one location in a first half position of the tubular reaction line, the first half position corresponding to 50% of an entire length of the tubular reaction line from an inlet of the tubular reaction line.

[7] The flow reactor according to [6], wherein the flow reactor comprises the internal temperature measurement units at two or more locations, and more than a majority of the internal temperature measurement units are provided in the first half position.

[8] The flow reactor according to any one of [1] to [7], wherein the tubular reaction line has a flow channel with an equivalent diameter of 0.1 mm or more and 50 mm or less.

[9] The flow reactor according to any one of [1] to [8] further comprising:
a raw material feeding unit provided on an upstream side of the tubular reaction line;
a discharge unit to discharge a reaction product produced in the tubular reaction line; and
temperature adjustment equipment to perform temperature control of the tubular reaction line.

[10] The flow reactor according to [9], wherein the temperature adjustment equipment performs the temperature control based on a temperature measured in the internal temperature measurement unit.

[11] The flow reactor according to [9] or [10],
wherein the temperature adjustment equipment comprises a fluid that is contactable with part or all of the tubular reaction line, and a container to contain the fluid, and
the temperature adjustment equipment controls a temperature and/or a feeding amount of the fluid based on a temperature measured in the internal temperature measurement unit.

[12] The flow reactor according to [11], wherein the temperature and/or the feeding amount of the fluid are controlled based on a program processing using a temperature measured in the internal temperature measurement unit as input information.

[13] The flow reactor according to any one of [9] to [12], wherein the flow reactor comprises two or more of the raw material feeding units and further comprises a mixing unit to mix raw materials fed from the two or more raw material feeding units, and
the mixing unit is provided between ends of the two or more raw material feeding units and the inlet of the tubular reaction line.

[14] A manufacturing facility comprising the flow reactor according to any one of [1] to [13].

Effects of the Invention

According to the present invention, a novel flow reactor capable of measuring the internal temperature is provided.

BRIEF DESCRIPTION OF THE DRAWINGS

FIG. 1 is a schematic view showing an example of the configuration of a flow reactor adopted in the present invention;

FIG. 2-1 is an enlarged schematic view showing an example of a tubular reaction line 1 into which a temperature sensor 3b of a thermometer 3a is inserted;

FIG. 2-2 is an enlarged schematic view showing another example of a tubular reaction line 1 into which a temperature sensor 3b of a thermometer 3a is inserted;

FIG. 2-3 is an enlarged schematic view showing another example of a tubular reaction line 1 into which a temperature sensor 3b of a thermometer 3a is inserted;

MODE FOR CARRYING OUT THE INVENTION

Hereinafter, the present invention will be described in more detail with reference to the drawings as necessary.

<Flow Reactor 10>

FIG. 1 is a schematic view showing an example of the configuration of a flow reactor 10 adopted in the present invention, and the example shown in FIG. 1 is the most basic example. As shown in the basic example of FIG. 1, the flow reactor 10 according to the present invention includes a tubular reaction line 1 and an internal temperature measurement unit 2 provided at one or more locations of the tubular reaction line 1. The internal temperature measurement unit 2 includes a thermometer 3a with a temperature sensor 3b, and the temperature sensor 3b is inserted into the tubular reaction line 1. In the flow reactor 10, a reaction proceeds while a solution is transferred through the tubular reaction line 1. According to the present invention, the temperature sensor 3b of the thermometer 3a is inserted into the tubular reaction line 1, and thus it becomes possible to directly measure the temperature of a reaction solution, whereby the temperature in the tubular reaction line 1 can be more accurately measured.

The flow reactor 10 according to the present invention may further include a raw material feeding unit 31 provided on an upstream side of the tubular reaction line 1, a discharge unit 32 to discharge a reaction product produced in the tubular reaction line 1, and temperature adjustment equipment 33 to perform temperature control of the tubular reaction line 1. The provision of the temperature adjustment equipment 33 in the flow reactor 10 allows the temperature management of the tubular reaction line 1.

The present invention also includes a manufacturing facility including the flow reactor 10.

In the present specification, the "flow reactor" refers to a chemical reaction apparatus having a narrow flow channel of the order of micrometers to centimeters as a reaction field. The reaction field is minimized in the flow reactor, and therefore, the flow reactor has features that heat and substances can be transferred at high speed, rapid mixing is possible, a reaction time can be controlled by a flow channel length, and the like, which cannot be achieved using ordinary batch reactors. In terms of the process, the flow reactor has features that facilities can be downsized, resulting in reduced cost for facilities, the amount of energy used can be minimized, resulting in reduced variable costs, the amount of hazardous substances used can be extremely reduced when handling hazardous substances, resulting in a dramatic increase in safety, and the like.

<Internal Temperature Measurement Unit 2>

FIG. 2-1 is an enlarged schematic view showing an example of the tubular reaction line 1 into which the temperature sensor 3b of the thermometer 3a is inserted. As shown in FIG. 2-1, the internal temperature measurement unit 2 has the thermometer 3a and the temperature sensor 3b of the thermometer 3a. The internal temperature measurement unit 2 may further include a support 3c for supporting the thermometer 3a.

The diameter of the thermometer 3a is not particularly limited as long as the thermometer 3a can be inserted into the tubular reaction line 1. The diameter of the thermometer 3a is generally 0.1 to 4 mm, and preferably 2 mm or less.

In order to measure the temperature of the reaction solution with high sensitivity and more accurately, it is preferred that the temperature sensor 3b (particularly, the tip of the temperature sensor 3b) be installed without touching the wall surface of the tubular reaction line 1.

The flow reactor 10 according to the present invention desirably includes the internal temperature measurement units 2 at two or more locations (preferably 3 or more locations, and preferably 10 or less locations, more preferably 5 or less locations). The provision of a plurality of internal temperature measurement units 2 makes it possible to monitor the temperature of the reaction solution at a plurality of locations of the tubular reaction line 1, whereby the temperature management and control of the tubular reaction line 1 can be more strictly performed.

In the flow reactor 10 according to the present invention, it is desirable that the internal temperature measurement unit 2 be provided at least one location in a first half position of the tubular reaction line 1, the first half position corresponding to 50% (preferably 40%, more preferably 30%) of the entire length of the tubular reaction line 1 from an inlet of the tubular reaction line 1. In a general chemical reaction, the temperature of a reaction solution rises immediately after the start of a reaction due to a heat of reaction. Therefore, if the internal temperature measurement unit 2 is provided in the first half position of the entire length of the tubular reaction line 1, it becomes possible to strictly perform the temperature management in the reaction solution immediately after the start of the reaction. As a result, the temperature control of the tubular reaction line 1 can be more precisely performed, whereby the flow reactor 10 has increased safety, and has also improved reaction yield, reaction selectivity, and the like.

It is desirable that the flow reactor 10 according to the present invention include the internal temperature measurement units 2 at two or more locations, and more than a majority of the internal temperature measurement units 2 be provided in the first half position. The provision of a larger number of the internal temperature measurement units 2 in the first half position of the tubular reaction line 1 makes it possible to measure the temperature change of the reaction solution immediately after the start of the reaction at a greater level of detail.

The internal temperature measurement unit 2 may be provided in a latter half position of the tubular reaction line 1, in addition to the first half position, the latter half position corresponding to 50% (preferably 40%, more preferably 30%) of the entire length of the tubular reaction line 1 from an outlet of the tubular reaction line 1.

<Tubular Reaction Line 1>

In the present specification, the "tubular reaction line" refers to an elongated hollow tube reactor. The cross section of the flow channel of the tubular reaction line 1 is desirably circular.

The length of the tubular reaction line 1 is preferably 1 cm or more, and more preferably 10 cm or more. The upper limit of the length of the tubular reaction line 1 is not particularly limited, and is preferably 500 m or less, and more preferably 300 m or less. The length of the tubular reaction line 1 may be appropriately determined according to a retention time of the reaction solution, and the like.

The shape of the tubular reaction line 1 may be appropriately selected in consideration of the length of the tubular reaction line 1, the installation space of the flow reactor 10, and the like, and is not particularly limited. The shape of the tubular reaction line 1 is preferably a curved shape such as a helical shape (coil shape), or a straight shape. The curved tubular reaction line 1 especially contributes to space saving of the flow reactor 10. When the tubular reaction line 1 is helical, a helical axis 20 may be substantially parallel to the direction of gravity or substantially perpendicular to the direction of gravity, and is preferably substantially parallel to the direction of gravity. By allowing the helical axis 20 to be substantially parallel to the direction of gravity, the helical tubular reaction line 1 can be installed by being suspended as shown in FIG. 1, and the tubular reaction line 1 after the reaction can be replaced easily.

In the flow reactor 10 according to the present invention, it is desirable that the tubular reaction line 1 be curved and include a straight flow channel 4 in part of the tubular reaction line 1, and the internal temperature measurement unit 2 be positioned in the straight flow channel 4. As described above, the curved tubular reaction line 1 contributes to space saving of the flow reactor 10. However, if the entirety of the curved tubular reaction line 1 is curved, it is difficult to insert the temperature sensor 3b of the thermometer 3a into the tubular reaction line 1, and the temperature sensor 3b tends to touch the wall surface of the tubular reaction line 1, resulting in difficulty in accurately measuring the temperature of the reaction solution. Therefore, it is preferred that the straight flow channel 4 be provided in part of the curved tubular reaction line 1, and the internal temperature measurement unit 2 be provided in the straight flow channel 4. This allows the internal temperature measurement unit 2 not to inhibit the flow of the reaction solution flowing in the tubular reaction line 1 and allows the temperature sensor 3b to hardly touch the wall surface of the tubular reaction line 1.

The flow channel length of the straight flow channel 4 is desirably long enough to accommodate the temperature sensor 3b. The flow channel length of the straight flow channel 4 is, for example, preferably 3 to 10 times, and more preferably 5 to 8 times the diameter of the thermometer 3a. Specifically, the flow channel length of the straight flow channel 4 is, for example, preferably 1 to 100 mm, and more preferably 5 to 50 mm.

When the tubular reaction line 1 is helical, the straight flow channel 4 may be provided substantially parallel to the helical axis 20 (for example, FIG. 1), and may be provided along a helical rotation plane. When the straight flow channel 4 is provided substantially parallel to the helical axis 20, the straight flow channel 4 is preferably provided inside, outside or on the circumference (for example, when a helical diameter varies depending on a helical cycle) of the circle drawn by the helix. When the straight flow channel 4 is provided along the helical rotation plane, the straight flow channel 4 is preferably provided inside or outside the circle drawn by the helix. The provision of the straight flow channel 4 along the helical rotation plane makes it possible to form the flow channel of the tubular reaction line 1 densely, resulting in space saving of the flow reactor 10.

In the flow reactor 10 according to the present invention, it is more desirable that the tubular reaction line 1 be helical, and the straight flow channel 4 be substantially parallel to the helical axis 20 of the helical tubular reaction line 1. When the tubular reaction line 1 is helical, a longer tubular reaction line 1 can be accommodated in a small space. Furthermore, by allowing the straight flow channel 4 to be substantially parallel to the helical axis 20 of the helical tubular reaction line 1, as shown in FIG. 1, a support that supports the tubular reaction line 1 (the raw material feeding units 31 and the discharging unit 32 serve also this function in FIG. 1) and a support that supports the thermometer 3a are attached to the flow reactor 10 without crossing each other, and therefore, the tubular reaction line 1 can be easily replaced after the reaction. In particular, when the helical axis 20 of the tubular reaction line 1 is substantially parallel to the direction of gravity, the helical tubular reaction line 1 and the internal temperature measurement units 2 can be installed by being suspended, resulting in a simplified apparatus.

As shown in FIG. 2-1, it is desirable that part of the tubular reaction line 1 include successive three flow channels of an inflow-side flow channel 11, an intermediate flow channel 12, and an outflow-side flow channel 13, and the straight flow channel 4 be the intermediate flow channel 12. Forming the intermediate flow channel 12 straight makes the insertion of the thermometer 3a easy. In particular, it is preferred that the intermediate flow channel 12 be substantially parallel to the helical axis 20 of the helical tubular reaction line 1 since such an intermediate flow channel 12 does not interfere with the replacement of the tubular reaction line 1, and as a result, the replacement can be easily performed.

The shapes of the inflow-side flow channel 11 and the outflow-side flow channel 13 are not particularly limited. Each of the inflow-side flow channel 11 and the outflow-side flow channel 13 may be formed straight as shown in FIG. 2-1 or curved as shown in FIG. 2-2, and is preferably formed straight. Forming both the inflow-side channel 11 and the outflow-side channel 13 straight makes the apparatus design easier.

The angles between the above three flow channels are not particularly limited. The angle formed by the inflow-side flow channel 11 and the intermediate flow channel 12, and the angle formed by the intermediate flow channel 12 and the outflow-side flow channel 13 may be each, for example, 85 to 95 degrees as shown in FIG. 2-1 (that is, approximately 90 degrees), may be each greater than 95 degrees as shown in FIG. 2-3, or may be each less than 85 degrees, and are each preferably 85 to 95 degrees, and more preferably 90 degrees. Adjusting the angles within the above range makes the apparatus design easier.

In the above-described tubular reaction line 1, as shown in FIG. 2-1, the flow direction of the reaction solution may be either a direction A in which the temperature sensor 3b is located upstream and a thermometer insertion portion 3d is located downstream, or a direction B in which the thermometer insertion portion 3d is located upstream and the temperature sensor 3b is located downstream. However, when the flow direction of the reaction solution is in the direction B in FIG. 2-1, the flow channel indicated as the inflow-side flow channel 11 acts as an outflow-side flow channel, and the flow channel indicated as the outflow-side flow channel 13 acts as an inflow-side flow channel. In particular, in the direction A, the reaction solution flows from the front toward the temperature sensor 3b, and therefore the direction A is suitable for more accurate temperature measurement. The thermometer insertion portion 3d refers to a portion of the thermometer 3a that is present in the tubular reaction line 1, the portion being situated farthest from the tip of the thermometer 3a that is present in the tubular reaction line 1.

The flow channel lengths of the inflow-side flow channel 11 and the outflow-side flow channel 13 are each preferably 5 to 100 mm, and more preferably 10 to 50 mm in terms of apparatus design.

In view of pressure drop and processing amount, the equivalent diameter of the flow channel of the tubular reaction line 1 is preferably 0.1 mm or more, more preferably 1.0 mm or more, and further preferably 1.5 mm or more, and is preferably 50 mm or less, more preferably 20 mm or less, and further preferably 15 mm or less.

In the present invention, the "equivalent diameter of the flow channel" indicates a diameter of a circular tube regarded as equivalent to the cross section of the flow channel. That is, the equivalent diameter De of the flow channel is represented by the following formula (i):

$$De = 4Af/Wp \tag{i}$$

(wherein Af is a cross sectional area of a flow channel, and Wp is a wet perimeter (the length of the wall in the cross section)).

The equivalent diameter of the flow channel of the tubular reaction line 1 may be uniform throughout the whole tubular reaction line 1 or may be changed in the middle of the tubular reaction line 1. If the equivalent diameter of the flow channel of the tubular reaction line 1 is uniform, the reaction proceeds evenly without the flow of the reaction solution being hindered. On the other hand, taking various conditions such as mixing performance and heat removal efficiency into consideration, the equivalent diameter of the flow channel of the tubular reaction line 1 may be changed in the middle of the tubular reaction line 1. The equivalent diameter of the flow channel may be changed at an arbitrary position, the number of times of changing the equivalent diameter of the flow channel is not limited, and the equivalent diameter of the flow channel may be changed once or twice or more as necessary. Furthermore, the equivalent diameter of the flow channel may be gradually changed or may be greatly changed with a certain point being as the border. The equivalent diameter of the flow channel may be smaller or may be larger than the equivalent diameter of the flow channel on the upstream side, and may be appropriately designed according to the reaction. The design of the flow channel is not limited to the following example. However, for example, since the mixing efficiency improves as the equivalent diameter of the flow channel of the tubular reaction line 1 decreases, it is also possible that the equivalent diameter of the flow channel of the tubular reaction line 1 immediately after the start of the reaction (that is, immediately after the mixing unit 36 described later) is made small, and after sufficient mixing, the equivalent diameter of the flow channel of the tubular reaction line 1 is made large.

The tube thickness of the tubular reaction line 1 may be uniform throughout the whole tubular reaction line 1 or may be changed in the middle of the tubular reaction line 1. If the tube thickness of the tubular reaction line 1 is made thin, the structure in which heat can be easily removable, and heat removal efficiency improves. If the tube thickness of the tubular reaction line 1 is thin, the cooling efficiency also increases. The tube thickness of the tubular reaction line 1 refers to the thickness of the material forming the flow channel of the tubular reaction line 1.

The outer diameter of the tubular reaction line 1 may be uniform throughout the whole tubular reaction line 1 or may be changed in the middle of the tubular reaction line 1. Since the heat removal efficiency improves as the outer diameter of the tubular reaction line 1 decreases, for example, for a portion requiring a precise temperature control, both the equivalent diameter of the flow channel of the tubular reaction line 1 and the outside diameter of the tubular reaction line 1 may be decreased. Alternatively, by increasing only the equivalent diameter of the flow channel and making the outer diameter of the tubular reaction line 1 uniform, the tube thickness of the tubular reaction line 1 is made thin, so that the structure in which can be heat easily escapes can be obtained.

The outer diameter of the tubular reaction line 1 in the present invention refers to the outer equivalent diameter of the tubular reaction line 1. In the present invention, the "outer equivalent diameter" refers to a diameter of a circular tube regarded as equivalent to the cross section of the tubular reaction line 1. That is, the outer equivalent diameter De' of the tube-type reactor is represented by the following formula (ii):

$$De' = 4Af'/Wp' \qquad (ii)$$

(wherein Af' is a cross sectional area of a tubular reaction line 1, and Wp' is a circumference of a tubular reaction line 1).

The inner wall of the tubular reaction line 1 is preferably formed of, for example, inorganic substances such as metals, silicon, glass and ceramic, or organic substances such as resins according to the characteristics of the reaction product.

The tubular reaction line 1 has an inlet for introducing a raw material into the tubular reaction line 1 and an outlet for discharging a product produced in the tubular reaction line 1 to the outside of the tubular reaction line 1. The installation positions of the inlet and the outlet are not particularly limited. The inlet may be placed at the same height as the outlet, at a position higher than the position of the outlet, or at a position lower than the position of the outlet. If the inlet is placed at a position lower than the position of the outlet, bubbles contained in the reaction solution are entrained by the flow of the reaction solution and discharged from the upper part of the tubular reaction line 1, so that bubbles hardly adhere to the inner wall of the tubular reaction line 1. As a result, the raw materials in the reaction solution can be efficiently brought into contact with each other.

<Raw Material Feeding Unit 31>

The flow reactor 10 according to the present invention desirably further includes a raw material feeding unit 31 provided on the upstream side of the tubular reaction line 1. The raw material feeding unit 31 corresponds to a unit to feed a raw material to be used in the tubular reaction line 1.

The flow reactor 10 according to the present invention may have two or more (for example, three) raw material feeding units 31 according to a reaction method. When the flow reactor 10 have two or more raw material feeding units 31, raw materials fed from either one or both raw material feeding units 31 may be a resultant product obtained by preliminarily mixing other raw materials in a premixer and then reacting them as necessary. Although not shown, the reaction solution discharged from the tubular reaction line 1 may be used as a raw material for a subsequent flow reactor 10. The reaction raw materials (including the preliminary reactant) are fed into the tubular reaction line 1 through these raw material feeding units 31. The reaction raw materials are usually fed in the form of gas or liquid (including solution).

When two or more raw material feeding units 31 are provided, the flow reactor 10 according to the present invention desirably further includes a mixing unit 36 to mix raw materials fed from the raw material feeding units 31. When the mixing unit 36 is present, the mixing unit 36 is provided between the ends of the two or more raw material feeding units 31 and the inlet of the tubular reaction line 1. The mixed solution obtained in the mixing unit 36 is fed as a reaction solution into the tubular reaction line 1 through the inlet of the tubular reaction line 1. The mixing unit 36 is preferably a tube, and the inner diameter of the tube is preferably 0.01 mm or more and 50 mm or less.

A known mixer may be provided in the mixing unit 36 in order to sufficiently stir the raw materials. Examples of such a mixer include a T-shape mixer, a Y-shape mixer, a static mixer, a helix-type mixer, and the like.

In the raw material feeding unit 31, the reaction raw materials are preferably fed by a feed control unit such as a diaphragm pump. The number of feed control units is not particularly limited and may be equal to or greater than or less than the number of the raw material feeding units 31. The feed control unit is not limited to a pump, and for example, a pressurized container to charge a reaction raw material can also be used as the feed control unit.

The raw material feeding unit 31 is preferably a tube (tubular), and the inner diameter of the tube is preferably 0.01 mm or more, more preferably 0.1 mm or more, and preferably 50 mm or less.

<Temperature Adjustment Equipment 33>

The flow reactor 10 according to the present invention desirably further includes temperature adjustment equipment 33 to perform temperature control of the tubular reaction line 1. The flow reactor has a larger specific surface area and better heat transfer performance as compared with those of a batch reactor, and thus temperature control can be performed quickly. Therefore, the provision of the temperature adjustment equipment 33 allows the temperature management of the reaction solution to be quickly performed. Due to the presence of the temperature adjustment equipment 33, reaction yields and quality can be improved in a system that initiates a reaction by heat, a system that lowers a temperature to suppress a by-product formation, and the like.

In the flow reactor 10 according to the present invention, the temperature adjustment equipment 33 may perform the temperature control based on a temperature measured in the internal temperature measurement unit 2. In the internal temperature measurement unit 2, the temperature of the reaction solution in the tubular reaction line 1 is directly measured, and therefore the temperature of the reaction solution is accurately measured. By feeding the accurately measured temperature of the reaction solution back to the temperature adjustment equipment 33, the temperature control of the tubular reaction line 1 can be performed more strictly.

The temperature adjustment equipment 33 is not limited to a specific embodiment as long as the temperature of the tubular reaction line 1 can be controlled. Examples of the specific embodiment of the temperature adjustment equipment 33 include an embodiment in which part or all of the tubular reaction line 1 is placed in a fluid of which temperature can be adjusted; and an embodiment in which part or all of the tubular reaction line 1 is configured in a multilayer structure (for example, a two-layer tube or the like) to adjust the temperature from the inner side, the outer side, or both sides of the layers.

For the temperature adjustment equipment 33 in the flow reactor 10 of the present invention, the embodiment in which the tubular reaction line 1 is placed in a fluid of which temperature can be adjusted is desirable. That is, the temperature adjustment equipment 33 desirably includes a fluid 34 that is contactable with part or all of the tubular reaction line 1, and a container 35 to contain the fluid 34, and controls a temperature and/or a feeding amount of the fluid 34 based on a temperature measured in the internal temperature measurement unit 2. By directly controlling the temperature and the feeding amount of the fluid 34 that is contactable with part or all of the tubular reaction line 1, the temperature of the tubular reaction line 1 in contact with the fluid 34 can be adjusted uniformly.

Examples of the fluid 34 that is contactable with part or all of the tubular reaction line 1 include water; an alcohol containing at least one alcohol selected from methanol, ethanol, ethylene glycol, propylene glycol, and the like, or aqueous solutions thereof; an acidic aqueous solution containing at least one acid selected from hydrochloric acid, sulfuric acid, phosphoric acid, acetic acid, citric acid, and the like; an alkaline aqueous solution containing at least one base selected from sodium hydroxide, potassium carbonate, and sodium hydrogen carbonate; an oxidizing aqueous solution such as a hydrogen peroxide solution, sodium hypochlorite aqueous solution, sodium chlorite aqueous solution or the like; and a reducing aqueous solution such as a sodium thiosulfate aqueous solution, sodium sulfite aqueous solution or the like. The state of the fluid 34 is not particularly limited, and may be either gas or liquid depending on the temperature of the fluid 34. Using such a fluid 34 enables easy control of the temperature.

Furthermore, when there exists, for example, a toxic substance such as acrylonitrile, acrolein, sulfurous acid gas, arsine, ammonia, carbon monoxide, chlorine, chloromethine, chloroprene, arsenic pentafluoride, phosphorus pentafluoride, ethylene oxide, nitrogen trifluoride, boron trifluoride, phosphorus trifluoride, hydrogen cyanide, diethylamine, disilane, sulfur tetrafluoride, silicon tetrafluoride, diborane, hydrogen selenide, trimethylamine, carbon disulfide, fluorine, bromomethyl, phosgene, phosphine, monogermane, monosilane, monomethylamine, or hydrogen sulfide in the tubular reaction line 1, and even if a solution in the tubular reaction line 1 leaks out of the tubular reaction line 1, the fluid 34 such as water, an acidic aqueous solution, an alkaline aqueous solution, an oxidizing aqueous solution or a reducing aqueous solution also serves as a quenching agent, and therefore safety can be ensured.

In the flow reactor 10 according to the present invention, it is desirable that the temperature and/or the feeding amount of the fluid 34 be controlled based on a program processing using a temperature measured in the internal temperature measurement unit 2 as input information. The temperature measured in the internal temperature measurement unit 2 can be fed back to the temperature adjustment equipment 33 more quickly by the introduction of the program processing, and therefore the temperature of the reaction solution in the tubular reaction line 1 can be controlled more strictly.

As shown in FIG. 1, the flow reactor 10 may be provided with an impeller 37 to stir the fluid 34.

It is also possible to adjust the temperatures of the raw material feeding unit 31 and/or the mixing unit 36 by the temperature adjustment equipment 33. Examples of an embodiment of adjusting the temperatures of the raw material feeding unit 31 and/or the mixing unit 36 by the temperature adjustment equipment 33 include, as in the tubular reaction line 1, an embodiment in which the raw material feeding unit 31 and/or the mixing unit 36 are placed in a fluid of which temperature can be adjusted; and an embodiment in which the raw material feeding unit 31 and/or the mixing unit 36 are configured in a multilayer structure (for example, a two-layer tube or the like) to adjust the temperature from the inner side, the outer side, or both sides of the layers.

<Discharge Unit 32>

It is desirable that the flow reactor 10 according to the present invention further include a discharge unit 32 to discharge a reaction product produced in the tubular reaction line 1. Not only the reaction product produced in the tubular reaction line 1 but also unreacted raw materials flow through the discharge unit 32. The discharge unit 32 is desirably connected to the outlet of the tubular reaction line 1.

The discharge unit 32 is preferably a tube, and the inner diameter of the tube is preferably 0.01 mm or more, more preferably 0.1 mm or more, and preferably 50 mm or less. It is desirable that the reaction solution collected from the discharge unit 32 be appropriately processed thereafter.

The raw material feeding unit 31, the mixing unit 36 and the discharge unit 32 are preferably made from a metal such as stainless steel, Hastelloy, titanium, copper, nickel, or aluminum; an inorganic material such as glass or ceramic; or a resin such as PEEK resin, silicone resin, or fluororesin. Electrical conductivity may be imparted to the resin. From the viewpoint of corrosion resistance, heat resistance and durability, the metal, particularly Hastelloy, is preferable. The raw material feeding unit 31, the mixing unit 36, and the discharge unit 32 may have either a single-layer structure or a multilayer structure. From the viewpoint of prevention of liquid leakage, at least one or all of the raw material feeding unit 31, the mixing unit 36, and the discharge unit 32 desirably have a multilayer structure.

Since the shape of the mixing unit 36 sometimes becomes complicated, when precise processing is required, it is advisable to use a metal or resin having good workability.

In the example shown in FIG. 1, the raw material feeding units 31 are preferably respectively connected to raw material storage containers (not shown) to store respective raw materials. The raw material feeding units 31 are preferably respectively provided with feed control units (not shown), and the mixed solution flows in the tubular reaction line 1 by the pressure generated by these feed control units. Preferably, the reaction solution discharged from the tubular reaction line 1 is temporarily stored in a reaction solution storage container.

<Manufacturing Facility>

The flow reactor 10 of the present invention can be used, for example, for a chemical reaction operation, an extraction operation, a separation operation, a purification operation, or the like, which is an example of a chemical reaction operation for a fluid. That is, the present invention also includes a manufacturing facility including the flow reactor 10 described above.

Examples of reaction solvents that can be used in the flow reactor 10 of the present invention include an aliphatic hydrocarbon-based solvent such as n-hexane, cyclohexane, or methylcyclohexane; an aromatic hydrocarbon-based solvent such as benzene, toluene, or xylene; an ether-based solvent such as diethyl ether, diisopropyl ether, tetrahydrofuran, 2-methyltetrahydrofuran, 4-methyltetrahydropyran, methyl tert-butyl ether, 1,4-dioxane, or cyclopentyl methyl ether; a halogen-based solvent such as methylene chloride, chloroform, 1,1,1,-trichloroethane, or chlorobenzene; an ester-based solvent such as ethyl acetate, propyl acetate, or butyl acetate; a ketone-based solvent such as acetone, methyl ethyl ketone, or methyl isobutyl ketone; a nitrile-based solvent such as acetonitrile, propionitrile, or butyronitrile; and an amide-based solvent such as N,N-dimethylformamide, N,N-dimethylacetamide, or N-methylpyrrolidone. These reaction solvents may be used singly or in combination of two or more.

In the flow reactor 10 of the present invention, various chemical reactions can be performed, and there is no particular limitation on the chemical reaction. Since a reaction in the flow reactor 10 is performed in a highly closed system, the flow reactor 10 can be also applied to a reaction using a hazardous chemicals such as acrylonitrile, acrolein, sulfurous acid gas, arsine, ammonia, carbon monoxide, chlorine, chloromethine, chloroprene, arsenic pentafluoride, phosphorus pentafluoride, ethylene oxide, nitrogen trifluoride, boron trifluoride, phosphorus trifluoride, hydrogen cyanide, diethylamine, disilane, sulfur tetrafluoride, silicon tetrafluoride, diborane, hydrogen selenide, trimethylamine, carbon disulfide, fluorine, bromomethyl, phosgene, phosphine, monogermane, monosilane, monomethylamine, or hydrogen sulfide.

The temperature in the tubular reaction line 1 during a reaction is not particularly limited as long as it is equal to or lower than the boiling point of the reaction solvent and equal to or higher than the freezing point of the reaction solvent, and preferably −80° C. or higher, more preferably −60° C. or higher, further preferably −40° C. or higher, preferably 200° C. or lower, more preferably 180° C. or lower, and further preferably 160° C. or lower.

The flow rate of the reaction solution in the tubular reaction line 1 is preferably 2 m/s or less, more preferably 1 m/s or less, and further preferably 0.8 m/s or less.

The reaction time (retention time) is preferably 60 minutes or less, more preferably 30 minutes or less, further preferably 15 minutes or less.

The present application claims priority based on Japanese Patent Application No. 2018-060121 filed on Mar. 27, 2018. All the contents described in Japanese Patent Application No. 2018-060121 filed on Mar. 27, 2018 are incorporated herein by reference.

DESCRIPTION OF REFERENCE NUMERALS

1: tubular reaction line
2: internal temperature measurement unit
3a: thermometer
3b: temperature sensor
3c: support
3d: thermometer insertion portion
4: straight flow channel
10: flow reactor
11: inflow-side flow channel
12: intermediate flow channel
13: outflow-side flow channel
20: helical axis
31: raw material feeding unit
32: discharge unit
33: temperature adjustment equipment
34: fluid
35: container
36: mixing unit
37: impeller
A, B: flow direction of the reaction solution

The invention claimed is:

1. A flow reactor comprising:
   a tubular reaction line;
   an internal temperature measurement unit provided at one or more location of the tubular reaction line, wherein
   the internal temperature measurement unit comprises a thermometer with a temperature sensor,
   the temperature sensor is positioned in the tubular reaction line,
   the tubular reaction line is a helical tubular reaction line comprising a helical axis and a straight flow channel in part of the tubular reaction line,
   the straight flow channel is substantially parallel to the helical axis of the helical tubular reaction line, and
   the internal temperature measurement unit is positioned in the straight flow channel.

2. The flow reactor according to claim 1,
   wherein the tubular reaction line comprises successive three flow channels formed of an inflow-side flow channel, an intermediate flow channel, and an outflow-side flow channel,
   the straight flow channel is the intermediate flow channel, and
   the intermediate flow channel is substantially parallel to the helical axis of the helical tubular reaction line.

3. The flow reactor according to claim 2, wherein each of the inflow-side flow channel and the outflow-side flow channel is formed straight.

4. The flow reactor according to claim 1, wherein the internal temperature measurement unit is provided at least one location in a first half position of the tubular reaction line, the first half position corresponding to 50% of an entire length of the tubular reaction line from an inlet of the tubular reaction line.

5. The flow reactor according to claim 4, wherein the flow reactor comprises the internal temperature measurement units at two or more locations, and more than a majority of the internal temperature measurement units are provided in the first half position.

6. The flow reactor according to claim 1, wherein the tubular reaction line has a flow channel with an equivalent diameter of 0.1 mm or more and 50 mm or less.

7. The flow reactor according to claim 1, further comprising:
   a raw material feeding unit provided on an upstream side of the tubular reaction line;
   a discharge unit to discharge a reaction product produced in the tubular reaction line; and
   temperature adjustment equipment to perform temperature control of the tubular reaction line.

8. The flow reactor according to claim 7, wherein the temperature adjustment equipment is configured to perform the temperature control based on a temperature measured in the internal temperature measurement unit.

9. The flow reactor according to claim 7,
   wherein the temperature adjustment equipment comprises a fluid that is contactable with part or all of the tubular reaction line, and a container to contain the fluid, and
   the temperature adjustment equipment controls a temperature and/or a feeding amount of the fluid based on a temperature measured in the internal temperature measurement unit.

10. The flow reactor according to claim 9, wherein the temperature and/or the feeding amount of the fluid are controlled based on a program processing using a temperature measured in the internal temperature measurement unit as input information.

11. The flow reactor according to claim 7, wherein the flow reactor comprises two or more of the raw material feeding units and further comprises a mixing unit to mix raw materials fed from the two or more raw material feeding units, and
   the mixing unit is provided between ends of the two or more raw material feeding units and the inlet of the tubular reaction line.

12. A manufacturing facility comprising the flow reactor according to claim 1.

13. The flow reactor according to claim 7, wherein the raw material feeding unit is a pipe provided on an upstream side of the tubular reaction line, and
   the discharge unit is a pipe provided on a downstream side of the tubular reaction line.

14. The flow reactor according to claim 11, wherein the mixing unit is a pipe.

15. The flow reactor according to claim 1, further comprising:
   at least two raw material feeding lines,
   wherein, the at least two raw material feeding lines are joined at a join portion so that raw materials fed to the at least two raw material feeding lines are mixed, and the tubular reaction line is connected to the joint potion so that the raw materials flows from the at least two raw material feeding lines to the tubular reaction line through the join portion.

16. A flow reactor comprising:
at least two raw material feeding lines;
a tubular reaction line comprising, as a main portion, a helical tubular line, which has a helical axis and partially includes a straight tubular portion parallel to the helical axis;
a temperature sensor; and
a temperature controller comprising a heat exchange medium and a tank accommodating the heat exchange medium, wherein
the at least two raw material feeding lines are joined at a join portion so that raw materials fed to the at least two raw material feeding lines are mixed at the join portion,
the tubular reaction line is connected to the joint portion so that the raw materials flow from the at least two raw material feeding lines to the tubular reaction line through the joint portion,
the temperature sensor is disposed in the straight tubular portion of the tubular reaction line so as to directly measure temperature of the raw materials flowing in the tubular reaction line,
the tubular reaction line and the temperature controller are configured such that the tubular reaction line are contacted with the heat exchange medium and temperature and/or amount of the heat exchange medium is adjusted based on the temperature of the reaction solution measured by the temperature sensor.

* * * * *